United States Patent
Caporusso et al.

(10) Patent No.: US 8,279,454 B2
(45) Date of Patent: Oct. 2, 2012

(54) METHOD OF MEASURING A LENGTH OF SECTIONS OF EXTRADOS OR INTRADOS CURVES OF AN ELONGATED WORKPIECE, AND RELEVANT LENGTH MEASURING INSTRUMENT

(75) Inventors: Alessandro Caporusso, Piedimonte San Germano (IT); Silvio Rea, Arpino (IT)

(73) Assignee: CML International S.p.A., Piedimonte San Germano (FR) (IT)

( * ) Notice: Subject to any disclaimer, the term of this patent is extended or adjusted under 35 U.S.C. 154(b) by 0 days.

(21) Appl. No.: 12/850,784

(22) Filed: Aug. 5, 2010

(65) Prior Publication Data
US 2011/0032542 A1    Feb. 10, 2011

(30) Foreign Application Priority Data
Aug. 6, 2009  (IT) .............................. RM2009A0430

(51) Int. Cl.
    *G01B 11/06* (2006.01)
(52) U.S. Cl. ................ 356/634; 72/7.1; 72/383; 72/319; 356/398; 356/606; 356/394
(58) Field of Classification Search .................. 356/375, 356/376, 634, 606, 398, 394; 72/7.1–7.4, 72/10.6, 17.3, 29.4, 16.2, 383–386, 319
See application file for complete search history.

(56) References Cited

U.S. PATENT DOCUMENTS

| | | | | |
|---|---|---|---|---|
| 4,761,979 A | * | 8/1988 | Kawaguchi et al. | ............ 72/173 |
| 7,802,456 B2 | * | 9/2010 | Ikeda et al. | .................... 72/16.2 |

\* cited by examiner

*Primary Examiner* — Gregory J Toatley
*Assistant Examiner* — Iyabo S Alli
(74) *Attorney, Agent, or Firm* — Young & Thompson

(57) ABSTRACT

A method of measuring a length of sections of extrados or intrados curves of an elongated workpiece travelling in a bending machine along a forwarding direction, the elongated workpiece having cross-sections each of which is separated by a neutral axis in both an extended portion and a compressed portion when the elongated workpiece is subjected to bending, and at least a neutral cross-section, i.e. not subjected to bending, neutral cross-section beyond which the bending of the elongated workpiece begins along the forwarding direction thereof, provides a measuring instrument positioned so that it engages either an extrados or an intrados point of the elongated workpiece near the neutral cross-section, but displaced therefrom in the forwarding direction of the elongated workpiece. Further, a measuring instrument on a bending machine that embodies the method is described.

2 Claims, 2 Drawing Sheets

METHOD OF MEASURING A LENGTH OF SECTIONS OF EXTRADOS OR INTRADOS CURVES OF AN ELONGATED WORKPIECE, AND RELEVANT LENGTH MEASURING INSTRUMENT

BACKGROUND OF THE INVENTION

1. Field of the Invention

The present invention relates to a method of measuring a length of sections of extrados or intrados curves of an elongated workpiece. Further, the invention refers to a relevant instrument, which is in the following an encoder that is mounted on a pyramidal bending machine only by way of example. Of course it should be understood that the method can be embodied also on a pipe bender different from the pyramidal roller bending machine.

2. Description of Related Art

When an elongated workpiece has to be bent according to varying curvature radii in order to obtain for example fixed radius sections spaced by different radius bends or in general varying radius bend sections and such an elongated workpiece has to copy exactly an already existing contour or profile, on which the elongated workpiece has to be adjusted, it is important that the bend sections have measures accurate as much as possible in length.

A contact length measuring device, generally an encoder, is currently used that is positioned along a pipe to be bent in a symmetrical point in the bending machine, i.e. on the projection of the axis of a deforming roller. However, this symmetrical cross-section of the pipe is not deformed upon the bending stress.

As known, an elongated workpiece, such as a pipe or other section iron to be bent, is a Saint-Vènant solid in cross-sections different from this symmetrical or neutral cross-section. Then, the Saint-Vènant solid's cross-section is divided by a separation line called neutral axis in two parts, one of which is extended and the other is compressed by the bending stress as applied from outside during a bending operation. Therefore, it happens that the extrados has a length major than the intrados due to the stretching caused by the bending. This stretching increases when increases the height of the elongated workpiece and decreases the curvature radius, and further it depends on the speed with which the bending of the elongated workpiece is performed.

Finally, even if most sophisticated means are used for controlling the bending operation such as laser means, it is important to check moment by moment the behaviour of the pipe in the bend sections being performed and in the projection thereof in a plane. In such a way it will occur less frequently that the manufactured workpieces do not match the expectations.

SUMMARY OF THE INVENTION

Consequently, a main object of the invention is to do a measurement as accurate as possible of linear length of bend sections of an elongated workpiece during a bending operation with respect to desired dimensions of extrados and intrados.

Another object of the invention is to perform a linear measurement of an elongated workpiece as near as possible to the point of deformation thereof in the machine.

Therefore, in a first aspect the invention provides a method of measuring a length of sections of extrados or intrados curves of an elongated workpiece travelling in a bending machine along a forwarding direction, the elongated workpiece having cross-sections each of which is separated by a neutral axis in both an extended portion and a compressed portion when the elongated workpiece is subjected to bending, and at least a neutral cross-section, i.e. not subjected to bending, neutral cross-section beyond which the bending of the elongated workpiece begins along the forwarding direction thereof, the length measuring being performed by a relevant instrument positioned so that, in measuring, it engages either an extrados or an intrados point of the elongated workpiece near the neutral cross-section, but displaced therefrom in the forwarding direction of the elongated workpiece.

In a second aspect the invention provides a length measuring instrument for measuring sections of extrados or intrados curves of an elongated workpiece travelling in a symmetrical pyramidal roller bending machine having a movable upper deforming roller and at least a pair of lower input and output driving rollers along the forwarding direction of the elongated workpiece, a central axis of symmetry of the bending machine being a trace of a neutral cross-section, i.e. not subjected to bending, the length measuring instrument being positioned so that, in measuring, it engages either an extrados or an intrados point of the elongated workpiece beyond the axis of symmetry of the bending machine toward the lower output driving roller.

BRIEF DESCRIPTION OF THE DRAWINGS

The present invention will be described with reference to a preferred embodiment thereof, in connection with the enclosed drawing, in which.

DETAILED DESCRIPTION OF PREFERRED EMBODIMENT

Figure 1:
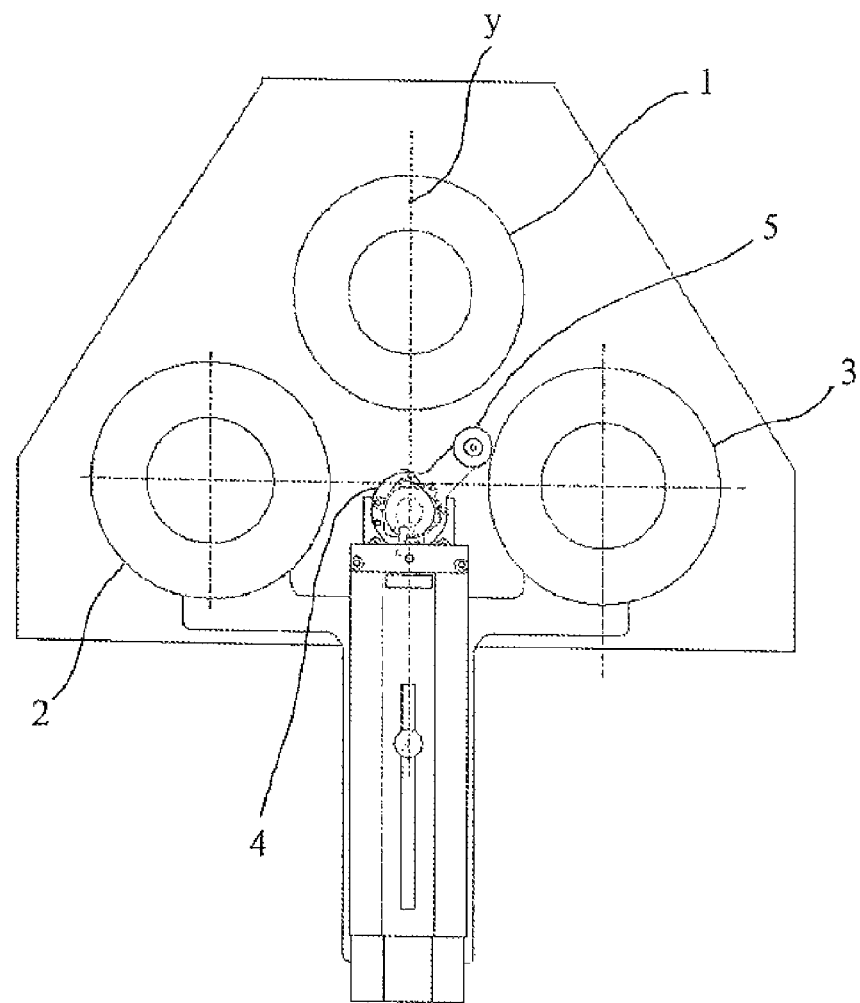
FIG. 1 shows very diagrammatically and fragmentary a side view of a machine in which the method of linear measurement of an elongated workpiece according to an embodiment of the present invention is embodied.
Figure 2:
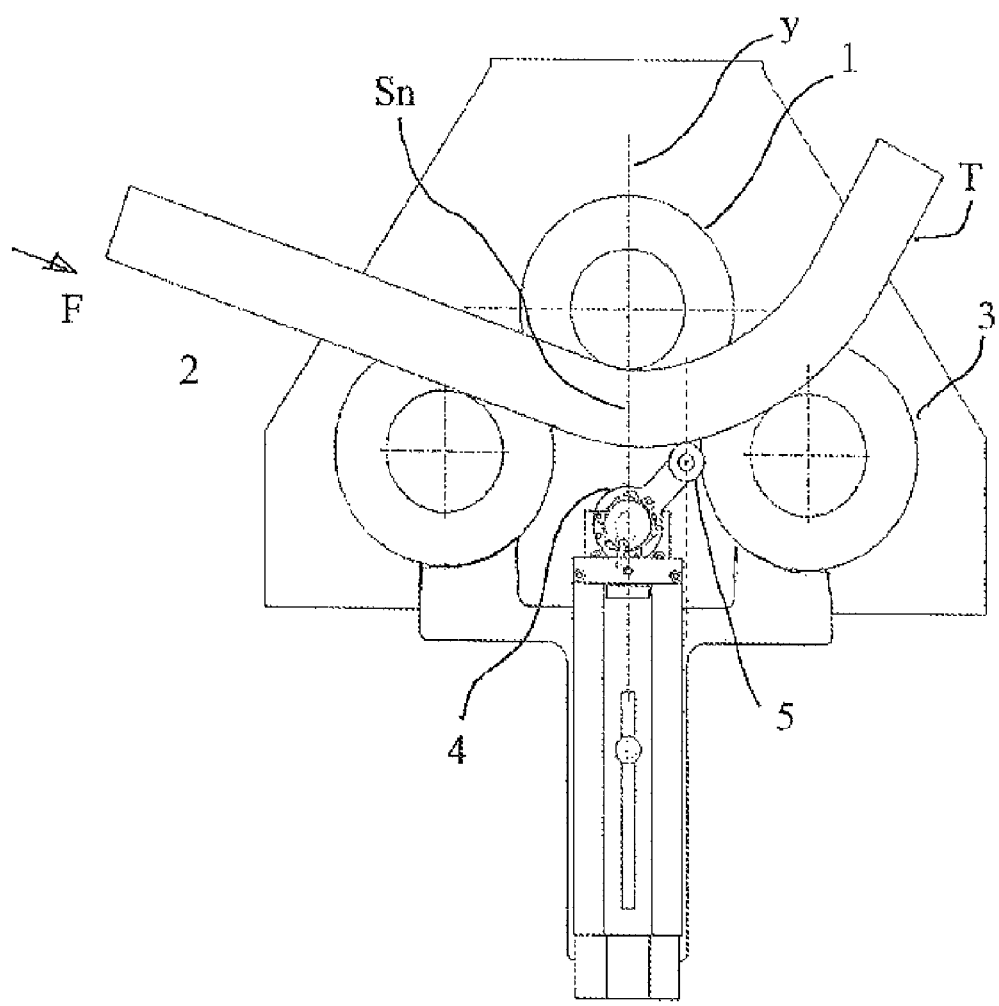
FIG. 2 shows the machine in FIG. 1 with the addition of an elongated workpiece for embodying the method according to the invention.

Referring to the figures, the machine on which the invention is embodied by way of example is a symmetrical pyramidal bending machine and comprises a set of three driver rollers 1, 2, and 3, at least one of which is a deforming roller, an elongated workpiece to be bent, for example a pipe T, being forwarded in the direction of an arrow F through the set of three driver rollers 1, 2, and 3 (FIG. 2). For clarity sake the lower rollers 2 and 3 are fixed in their position, and the upper roller 1 is adjustable in each vertical position and can be controlled by the machine to move according a feed-back control in vertical direction. An encoder for measuring the feeding of the pipe T through the set of the driver rollers 1, 2, and 3 is indicated as 4. The encoder 4 is a part, like other components not shown nor described here, of a control system managing the operation of the machine.

According to the method of the present invention the encoder 4 is a length measuring instrument for measuring sections of extrados curves of the elongated workpiece T during its movement in the symmetrical pyramidal roller machine by means of the movable upper deforming roller 1 and the pair of lower entrance and exit rollers 2 and 3 depending on the direction of movement of the elongated workpiece defined by the arrow F. The axis y is the central axis of symmetry of the bending machine and is a trace of a neutral cross-section Sn, i.e. not subjected to bending stress. For this reason the encoder 4, even if it is arranged axially, has a detection wheel 5 positioned for engaging a point of extrados of the elongated workpiece beyond the axis y of symmetry of the bending machine toward the lower driver exit roller 3.

Thanks to the encoder the sections of curve of extrados of the workpiece can be reproduced as desired with reference to the length and the radius of the individual sections as well as to its arrangement in the plane.

Although it is not shown, the encoder can be positioned so that it engages points of intrados of the elongated workpiece according to the needs.

As an alternative to the encoder, the measuring instrument can be a laser length measuring instrument.

It should be understood that the invention is not limited to the described embodiment but can be embodied also in other bending machines, to which the method of the present invention can be applied.

What is claimed is:

1. A method of measuring a length of sections of extrados or intrados curves of an elongated workpiece, comprising:
    moving the elongated workpiece in a bending machine along a forwarding direction, the elongated workpiece having cross-sections each of which is separated by a neutral axis in both an extended portion and a compressed portion when the elongated workpiece is subjected to bending, and at least a neutral cross-section that is not subjected to bending, neutral cross-section beyond which the bending of the elongated workpiece begins along the forwarding direction thereof,
    wherein the length measuring is performed by an encoder engaging either an extrados or an intrados point of the elongated workpiece near the neutral cross-section, but displaced therefrom in the forwarding direction of the elongated workpiece.

2. A length measuring instrument for measuring sections of extrados or intrados curves of an elongated workpiece travelling in a symmetrical pyramidal roller bending machine having a movable upper deforming roller and at least a pair of lower input and output driving rollers along the forwarding direction of the elongated workpiece, a central axis of symmetry of the bending machine being a trace of a neutral cross-section, that is not subjected to bending,
    wherein the length measuring instrument comprises one of an encoder and a laser measuring instrument and is positioned to measure as the length measuring instrument engages or illuminates either an extrados or an intrados point of the elongated workpiece beyond the axis of symmetry of the bending machine toward the lower output driving roller.

* * * * *